Figure 1:
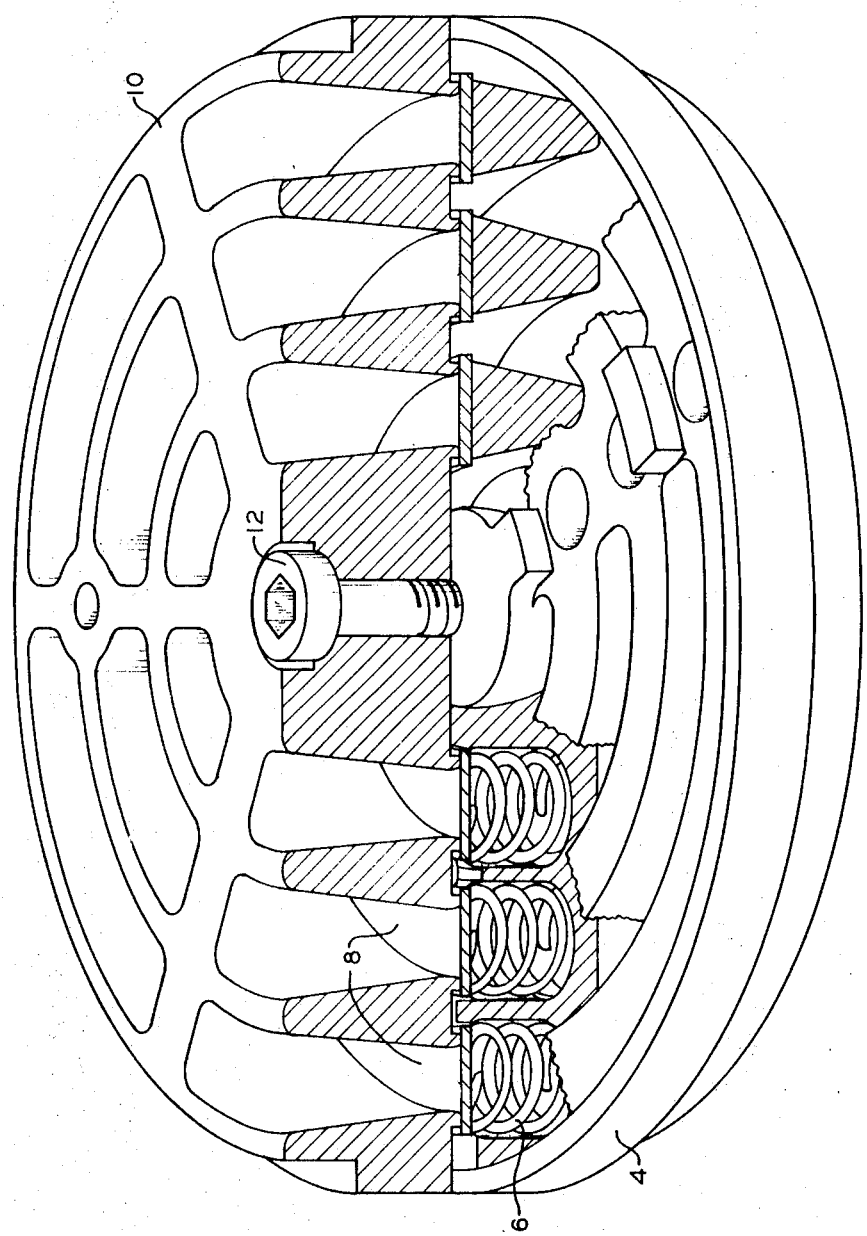

United States Patent

[11] 3,612,507

| [72] | Inventor | Edward E. Stokes |
| | | Borger, Tex. |
| [21] | Appl. No. | 886,089 |
| [22] | Filed | Dec. 18, 1969 |
| [45] | Patented | Oct. 12, 1971 |
| [73] | Assignee | Phillips Petroleum Company |

[54] VALVE ASSEMBLING APPARATUS
3 Claims, 3 Drawing Figs.

[52] U.S. Cl. .................................................. 269/47,
29/200 J, 29/271
[51] Int. Cl. .................................................. B25b 27/14
[50] Field of Search ........................................... 269/47, 321
ME; 29/200 J, 271

[56] References Cited

UNITED STATES PATENTS

| 1,938,375 | 12/1933 | Coffee ........................ | 269/47 |
| 3,064,715 | 11/1962 | Bland ......................... | 29/271 X |
| 3,111,769 | 11/1963 | Carlisle et al. ............. | 29/271 X |
| 3,540,552 | 11/1970 | Eich ........................... | 269/47 X |

FOREIGN PATENTS

| 1,183,674 | 7/1959 | France ........................ | 29/271 |

Primary Examiner—William S. Lawson
Attorney—Young and Quigg

ABSTRACT: An apparatus having protrusions for holding a plurality of rings of a multiring-type valve against lateral movement during assembly of said valve.

PATENTED OCT 12 1971

3,612,507

FIG. I

INVENTOR.
E. E. STOKES

BY Young & Quigg

ATTORNEYS

VALVE ASSEMBLING APPARATUS

This invention resides in an apparatus for assembling a multiring-type compressor valve. In another aspect, this invention resides in an apparatus for maintaining the rings of a multiring-type compressor valve during assembly of the valve.

During assembly of a multiring-type compressor valve, a plurality of springs are positioned in a stop plate, a plurality of concentric rings are positioned on the stop plate and the springs and thereafter a valve seat is placed in contact with the rings and secured to the seat with a bolt. Since the springs maintain the rings at a slightly higher elevation than the stop plate prior to installation of the valve seat and are not held against lateral movement, it is exceedingly difficult and time consuming to correctly position the valve seat without moving the rings from their proper position.

It is therefore an object of this invention to provide an apparatus for maintaining the rings of a multiring-type compressor valve during assembly of the valve. Another object of this invention is to provide an apparatus for use in assembling a valve of the above-described type whereby the assembly of said valve requires less time and labor. Other aspects, objects, and advantages of the present invention will become apparent from a study of the disclosure, the appended claims, and the drawing.

The drawings show the apparatus of this invention and the valve on which the apparatus is used. FIG. 1 is an isometric view in partial section of an assembled multiring-type compressor valve, FIG. 2 is an isometric view of the stop plate of the valve, and FIG. 3 is an isometric view of the apparatus of this invention.

FIG. 1 shows a multiring-type compressor valve 2 having a stop plate 4, a plurality of springs 6, a plurality of concentric spaced-apart rings 8, a valve seating element 10 and a bolt 12 or fastening means for urging the valve seat 10 and stop plate toward one another.

Figure 2:
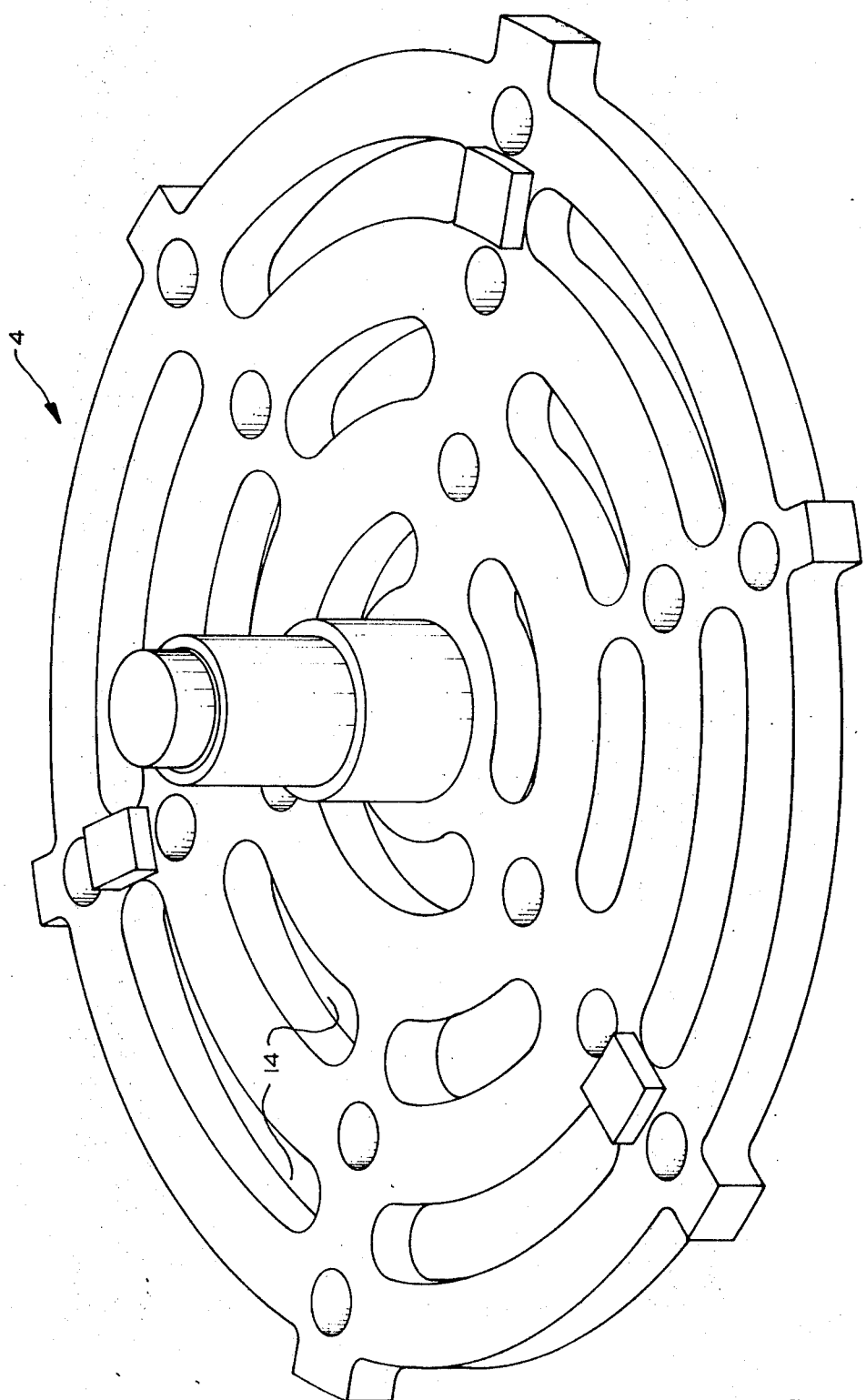

Referring to FIG. 2, the stop plate 4 has a plurality of spaced-apart, concentric interrupted openings 14 extending therethrough. In the assembled condition of the valve 2 (better shown in FIG. 1) each opening 14 through the stop plate 4 is adjacent the space between adjacent rings 8 of the concentrically positioned plurality of rings.

Figure 3:
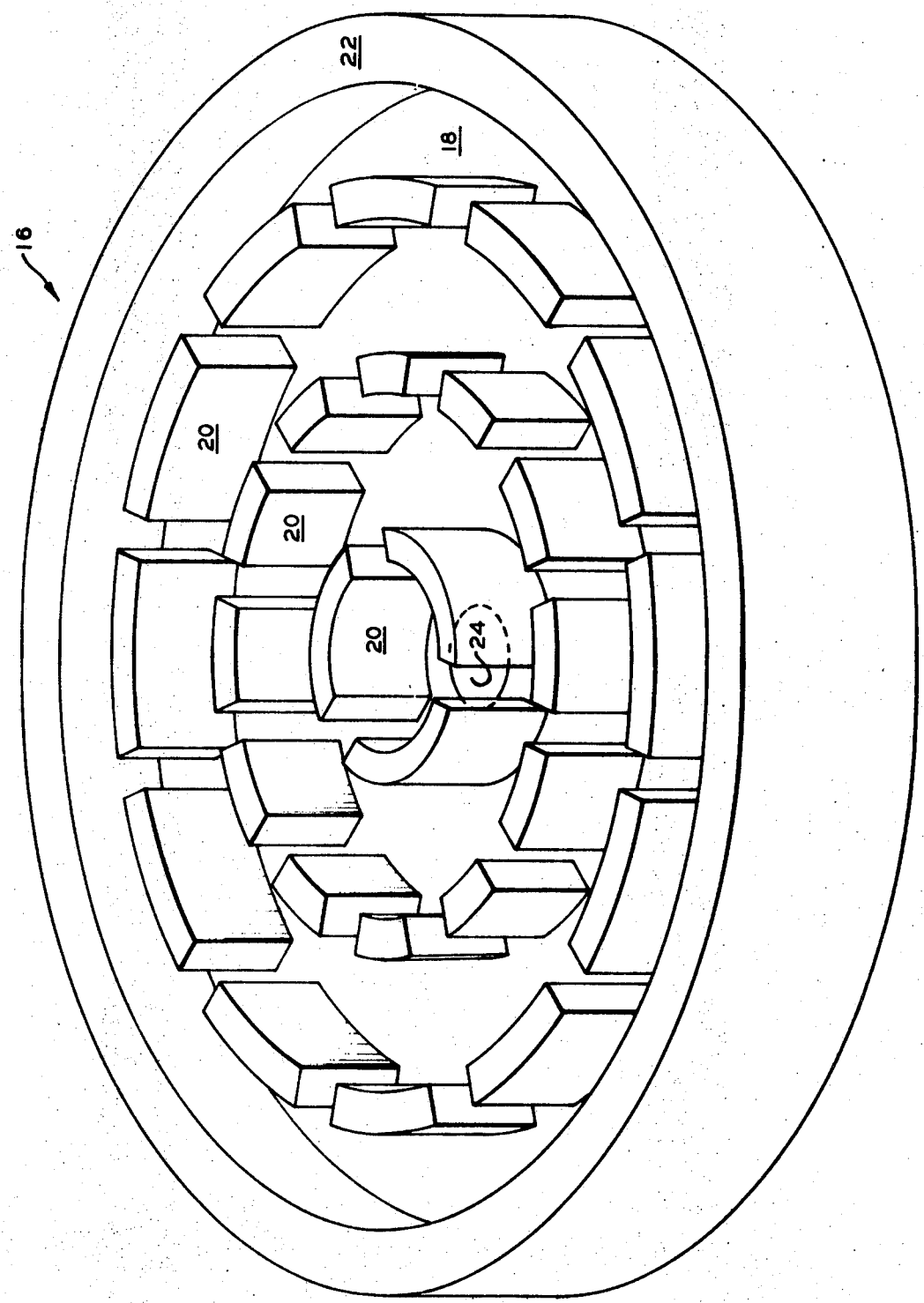

FIG. 3 shows the holding element 16 of this invention. The element 16 has base 18 with a plurality of spaced-apart, concentric interrupted protrusions 20 extending from the base 18. These protrusions 20 have a length sufficient to extend through the stop plate 4 and to a position between adjacent rings 8 resting on the springs 6 that are supported by the stop plate 4 during assembly of the valve 2. The thickness of each protrusion should be substantially the same as the distance between the adjacent rings with which said protrusion 20 is associated when said rings are correctly positioned and assembled. The number of protrusions 20 and the location of said protrusions 20 relative to the rings 8 should be sufficient to extend through at least a portion of the openings 14 through the stop plate 4 and maintain the plurality of rings 8 during assembly of the valve 2. The protrusions are dependent upon the construction of the stop plate and the number of rings 8 and the apparatus of this invention can be constructed so that the protrusions 20 correspond to the various manufacturers' valve construction.

In order to facilitate insertion of the protrusions 20 through the stop plate 4, it is preferred that the apparatus has a retaining rim 22 extending from the base 18 in the same direction as the protrusions with said rim 22 having an inside diameter larger than the diameter of the stop plate 4. By so constructing a rim 22 on the holding element 16, the stop plate 4 can be inserted into the holding element 16 with the protrusions 20 extending through the openings 14 of the stop plate 4.

Since the valve 2 and its elements are relatively heavy, it is preferred that the holding element 16 of this invention be constructed of metal in order to withstand the forces to which it is subjected and maintain the rings 8 at the desired locations. The holding element 16 should also have a central opening 24 extending therethrough for attachment of the bolt 12 of the valve 2.

In the use of this invention, the holding element 16 is placed on the assembly bench with the protrusions 20 of the holding element 16 extending upwardly. The stop plate 4 is then inserted within the holding element 16 with the protrusions 20 extending through the openings 14 of the stop plate 4. The plurality of springs 6 are then inserted in the stop plate 4 and the plurality of concentric rings 8 are placed on top of the springs 6. In this position the protrusions 20 are extending between and contacting adjacent rings thereby preventing lateral movement of the rings 8 relative to one another. With the rings 8 so maintained against lateral movement, the valve seat 10 can be placed in contact with the rings without displacing the rings and thereafter said valve seat 10 can be affixed to the stop plate 4 with the bolt 12. The assembled valve 2 is thereafter withdrawn from the holding element.

By so constructing and using the holding element 16 of this invention, it has been discovered that the time and labor required to assemble a multiring-type compressor valve has been considerably reduced. Previously, about 60–90 minutes was required to assemble the valve. With the use of this invention, the valve can now be assembled in about three minutes.

Other modifications and alterations of this invention will become apparent to those skilled in the art from the foregoing discussion and accompanying drawing, and it should be understood that this invention is not to be unduly limited thereto.

I claim:

1. An apparatus for maintaining the rings of a multiring-type compressor valve during attachment of a valve seat to a stop plate of the valve, said stop plate having a plurality of spaced-apart, concentric, interrupted openings extending therethrough with each opening adjacent a space between adjacent rings of the concentrically positioned plurality of rings in the assembled position of the seat, rings, and stop plate of the valve, comprising:

a holding element having a base with a plurality of spaced-apart, concentric, interrupted protrusions extending from the base, said protrusions having dimensions sufficient to extend through the stop plate to a position between adjacent rings supported by the stop plate and being of a number and at a position relative to the rings sufficient to extend through at least a portion of the openings of the stop plate and maintain the plurality of rings during assembly of the valve.

2. An apparatus, as set forth in claim 1, wherein the holding element is formed of metal and the thickness of each protrusion is substantially the same as the distance between correctly assembled adjacent rings.

3. An apparatus, as set forth in claim 1, wherein the holding element has a retaining rim extending from the base in the same direction as the protrusions and having an inside diameter larger than the diameter of the stop plate for receiving said stop plate therewithin.